(12) United States Patent
Alexander et al.

(10) Patent No.: US 10,082,089 B2
(45) Date of Patent: Sep. 25, 2018

(54) SYSTEMS AND METHODS TO IMPROVE SHUT-DOWN PURGE FLOW IN A GAS TURBINE SYSTEM

(71) Applicant: General Electric Company, Schenectady, NY (US)

(72) Inventors: Michael Joseph Alexander, Simpsonville, SC (US); Lewis Berkley Davis, Jr., Niskayuna, NY (US); David August Snider, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 112 days.

(21) Appl. No.: 15/247,146

(22) Filed: Aug. 25, 2016

(65) Prior Publication Data
US 2018/0058337 A1   Mar. 1, 2018

(51) Int. Cl.
| | | |
|---|---|---|
| *F02C 9/50* | (2006.01) | |
| *F01D 21/00* | (2006.01) | |
| *F02C 3/04* | (2006.01) | |
| *F02C 6/18* | (2006.01) | |
| *F01D 25/00* | (2006.01) | |
| *F02C 7/04* | (2006.01) | |

(Continued)

(52) U.S. Cl.
CPC .............. *F02C 9/50* (2013.01); *F01D 21/003* (2013.01); *F01D 25/002* (2013.01); *F01K 13/003* (2013.01); *F01K 23/10* (2013.01); *F02C 3/04* (2013.01); *F02C 6/18* (2013.01); *F02C 7/04* (2013.01); *G05B 19/41835* (2013.01); *G05D 7/0623* (2013.01); *F05D 2220/32* (2013.01); *F05D 2220/72* (2013.01);
(Continued)

(58) Field of Classification Search
CPC ... F02C 9/28; F02C 6/18; G05B 15/02; F01K 23/10; F01K 13/003; F01D 21/003; F05D 2270/306; F05D 2270/303; F05D 2270/54; F05D 2220/72; F05D 2270/304; F05D 2220/32
See application file for complete search history.

(56) References Cited

U.S. PATENT DOCUMENTS

| 5,819,539 A | 10/1998 | Bauver, II |
| 7,861,532 B2 | 1/2011 | Law et al. |

(Continued)

FOREIGN PATENT DOCUMENTS

| EP | 0961011 A1 | 12/1999 | |
| EP | 1108870 A2 * | 6/2001 | ........... F01K 21/047 |
| EP | 2672076 A2 | 11/2013 | |

*Primary Examiner* — Kenneth M Lo
*Assistant Examiner* — David J Wynne
(74) *Attorney, Agent, or Firm* — Fletcher Yoder, P.C.

(57) ABSTRACT

A system includes a controller including a memory storing instructions to perform operations of a power generation system and a processor that executes the instructions. The instructions cause the controller to control purging fluid flow to an inlet of a gas turbine, an exhaust of the gas turbine, or a combustion section of the gas turbine. The instructions cause the controller to receive a first temperature at the inlet, a rotational speed of the gas turbine, and a purging fluid flow rate. The instructions cause the controller to calculate an exhaust flow rate of the system based on at least the first temperature, the rotational speed, and the purging fluid flow rate. The instructions cause the controller to control the system to isolate a fuel source from the gas turbine at a portion of normal operating speed sufficient to achieve a purging volume during coast down.

20 Claims, 10 Drawing Sheets

(51) Int. Cl.
  *F01K 13/00* (2006.01)
  *F01K 23/10* (2006.01)
  *G05D 7/06* (2006.01)
  *G05B 19/418* (2006.01)

(52) U.S. Cl.
  CPC .... *F05D 2240/35* (2013.01); *F05D 2270/303* (2013.01); *F05D 2270/304* (2013.01); *F05D 2270/306* (2013.01); *F05D 2270/54* (2013.01); *G05B 2219/34315* (2013.01)

(56) References Cited

U.S. PATENT DOCUMENTS

| | | | |
|---|---|---|---|
| 8,726,625 B2 | 5/2014 | Holt et al. | |
| 8,820,078 B1 | 9/2014 | Duffy | |
| 8,844,295 B2 | 9/2014 | Snider et al. | |
| 2005/0066658 A1* | 3/2005 | Longnecker | F02D 23/00 60/602 |
| 2007/0251210 A1* | 11/2007 | Ceric | F01D 25/002 60/226.1 |
| 2009/0145104 A1 | 6/2009 | Alexander et al. | |
| 2009/0205310 A1* | 8/2009 | Hibshman, II | F01K 23/101 60/39.182 |
| 2011/0302922 A1* | 12/2011 | Li | F01K 23/101 60/645 |
| 2012/0240591 A1* | 9/2012 | Snider | F01K 23/101 60/772 |
| 2013/0167550 A1* | 7/2013 | Snider | F01D 19/00 60/778 |
| 2015/0159561 A1 | 6/2015 | Seely et al. | |
| 2015/0226133 A1* | 8/2015 | Minto | F02C 3/34 60/39.27 |

\* cited by examiner

SYSTEMS AND METHODS TO IMPROVE SHUT-DOWN PURGE FLOW IN A GAS TURBINE SYSTEM

BACKGROUND

The present disclosure relates generally to power generation systems. In particular, the present disclosure relates to systems and methods to improve shut-down purge flow in a gas turbine system.

Gas turbine generators, which are often used in combined cycle power plants, may be shut-down and started-up based on demand for electricity in an area that the combined cycle power plant operates. Such demand may constantly fluctuate based on uncontrollable external factors. Once the gas turbine generators are shut-down, the gas turbine generators must undergo a series of purging steps prior to restarting the gas turbine generators. The series of purging steps may be time consuming, and when the demand for electricity rises rapidly, it may inhibit the gas turbine generator from supplying additional electricity upon receiving an indication of the heightened demand.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below.

In a first embodiment, a system includes a controller of a gas turbine and heat recovery steam generator (HRSG) system. The controller includes a memory storing instructions to perform operations of the gas turbine and HRSG system and a processor that executes the instructions. Additionally, the instructions, when executed by the processor, cause the controller to control purging fluid flow from at least one purging fluid flow source to an inlet of a compressor section of a gas turbine of the gas turbine and heat recovery steam generator (HRSG) system, an exhaust of the gas turbine, or a combustion section of the gas turbine during deceleration of the gas turbine. Further, the instructions cause the controller to receive a first input signal representative of a first temperature at an inlet of a compressor section of the gas turbine, a second input signal representative of a rotational speed of the gas turbine, and a third input signal representative of a purging fluid flow rate of the at least one purging fluid flow source. Furthermore, the instructions cause the controller to calculate an exhaust flow rate of the gas turbine and HRSG system based on at least the first input signal and the second input signal, and a third input signal. Moreover, the instructions cause the controller to control the gas turbine and HRSG system to isolate a fuel source from the gas turbine at a portion of normal operating speed of the gas turbine sufficient to achieve a predetermined purging volume during coast down of air flow through the gas turbine and HRSG system based on the exhaust flow rate.

In a second embodiment, a method includes utilizing a controller to control at least one purging fluid flow source to provide a supplemental purging fluid flow to a gas turbine and a heat recovery steam generator (HRSG) of a gas turbine and HRSG system. The method also includes utilizing the controller to receive a first measurement of a first temperature of the gas turbine and HRSG system from a first sensor. The first measurement of the first temperature includes at least a temperature at an inlet of the gas turbine. Additionally, the method includes utilizing the controller to receive a second measurement of a rotational speed of the gas turbine from a second sensor and receive a third measurement of a supplemental purging fluid flow rate of the supplemental purging fluid flow from a third sensor. Further, the method includes utilizing the controller to calculate exhaust volume flow rate of the gas turbine and HRSG system based on at least the first temperature, the rotational speed of the gas turbine, and the purging fluid flow rate. Furthermore, the method includes utilizing the controller to receive obtain a purging volume of the gas turbine and HRSG system that is based on at least a volume of an HRSG of the gas turbine and HRSG system. Moreover, the method includes utilizing the controller to control the gas turbine and HRSG system to isolate a fuel source from the gas turbine at a portion of normal operating speed of the gas turbine sufficient to achieve the purging volume during coast down of air flow through the gas turbine and HRSG system based on the exhaust volume flow rate.

In a third embodiment, a tangible, non-transitory, machine-readable-medium, includes machine-readable instructions to control at least one purging fluid flow source to provide a supplemental purging fluid flow to a gas turbine of a power generation system. Additionally, the machine-readable-medium includes machine-readable instructions to receive a first measurement of a first temperature of the power generation system from a first sensor. The first measurement of the first temperature includes at least a temperature at an inlet of the gas turbine. Further, the machine-readable-medium includes machine-readable instructions to receive a second measurement of a rotational speed of the gas turbine from a second sensor and receive a third measurement of a supplemental purging fluid flow rate of the supplemental purging fluid flow from a third sensor. Furthermore, the machine-readable-medium includes machine-readable instructions to calculate exhaust flow rate of the power generation system based on at least the first temperature, the rotational speed of the gas turbine, and the supplemental purging fluid flow rate. Moreover, the machine-readable-medium includes machine-readable instructions to control the power generation system to isolate a fuel source from the gas turbine at a portion of normal operating speed of the power generation system sufficient to achieve a purging volume during coast down of air flow through the power generation system based at least on the exhaust flow rate.

BRIEF DESCRIPTION OF THE DRAWINGS

These and other features, aspects, and advantages of the presently disclosed subject matter will become better understood when the following detailed description is read with reference to the accompanying drawings in which like characters represent like parts throughout the drawings, wherein.

DETAILED DESCRIPTION

One or more specific embodiments of the presently disclosed systems and techniques will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is generally directed to systems and methods for managing purge flow of a gas turbine generator. For example, a system may include a gas turbine generator that may undergo a purging process prior to restarting after a shut-down period. To help decrease time used to bring the gas turbine generator back online, the present disclosure describes systems and methods for providing a purging flow to the gas turbine generator during shut-down operations. As such, the purging flow provided during the shut-down operations may limit or remove an amount of purging flow used prior to reaching a "purge complete" condition during a start-up operation of the gas turbine generator.

Figure 1:
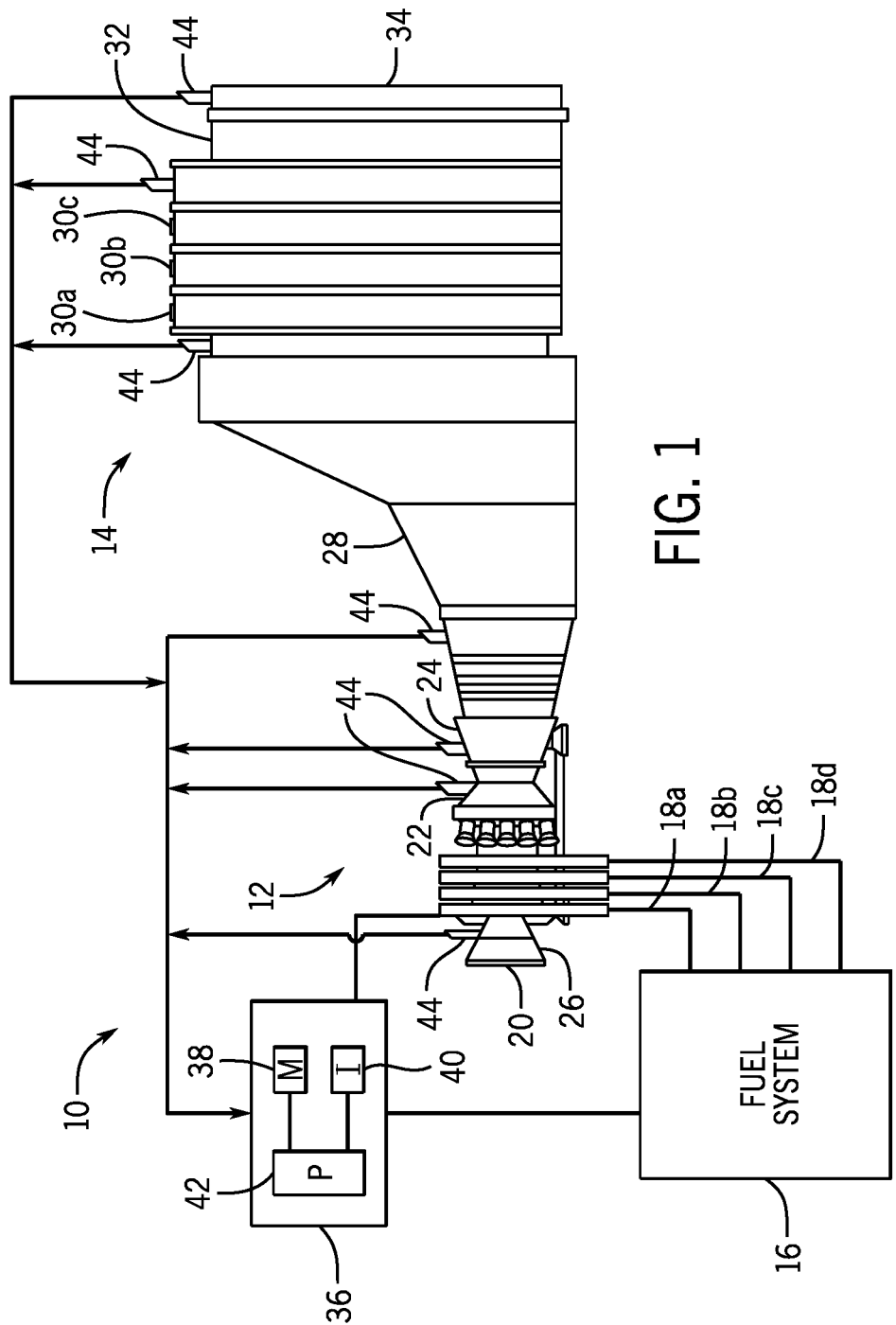
FIG. 1 is a block diagram of a gas turbine and heat recovery steam generator used to generate power in a combined cycle power plant, in accordance with embodiments described herein.

FIG. 1 is a block diagram of a system 10 (e.g., a power generation system) including a gas turbine 12 and a heat recovery steam generator (HRSG) 14, which is generally used to generate power in a combined cycle power plant. The system 10 includes the gas turbine 12, the heat recovery steam generator (HRSG) 14, and a fuel system 16. The fuel system 16 generally provides fuel to the gas turbine 12 for combustion. In particular, the fuel system 16 may include a piping configuration that includes one or more pressure cavities that in conjunction with a plurality of valves supply fuel to the gas turbine 12 in a controlled manner. As illustrated in FIG. 1, four fuel lines 18a, 18b, 18c, and 18d provide fuel from the fuel system 16 to the gas turbine 12. It may be appreciated that while four fuel lines 18a-18d are depicted, more or less fuel lines 18 may also provide fuel to the gas turbine 12.

The exemplary gas turbine 12 may include a compressor section 20, a combustion section 22 and a turbine section 24. The compressor section 20 may include a series of compressor stages, and each compressor stage may include a plurality of compressor blades that rotate to compress air. The compressor section 20 generally receives ambient air at an inlet to the compressor section 20, compresses the air at the compressor stages, and provides the compressed air at the outlet of the compressor section 20 to the combustion section 24. An inlet guide vane 26 at the inlet of the compressor section 20 can be adjusted (e.g., opened and closed) to regulate a flow of air through the compressor section 20.

In the combustion section 22, fuel from the fuel system 16 is mixed with the compressed air from the compressor section 20. The air/fuel mixture is then ignited using an ignition device such as a spark plug to create a working gas. The working gas is directed through the turbine section 24. The turbine section 24 may include a serial arrangement of stages, each stage having rotating blades known as buckets. The rotating buckets are supported by a common rotary shaft. The working gas exiting the combustion section 22 expands through the serial stages to cause rotation of the buckets and therefore of the rotary shaft. In one aspect, the rotary shaft of the turbine section 24 may be connected to the compression blades in the compressor section 20 so that rotation of the rotary shaft drives air compression in the compressor section 20. The rotary shaft also extends beyond the turbine section 24 to an electric generator (not shown) where the rotary motion of the rotary shaft is converted into electrical power. Meanwhile the exhausted working gas from the turbine section 24 is directed toward the HRSG 14.

The HRSG 14 receives exhaust from the gas turbine 12 and uses the exhaust as a heat source to drive one or more steam turbines. The HRSG 14 may include an inlet 28, a high pressure superheater (not shown) and one or more HSRG pressure sections 30a, 30b, and 30c, which are operable to generate steam at high pressure, intermediate pressure, and/or low pressure, respectively. Exhaust gas from the HRSG 14 is sent through an HRSG outlet duct 32 to an exhaust stack 34.

The gas turbine 12 and the fuel system 16 may be coupled to a control unit 36 (e.g., a controller). The control unit 36 may be a computer system that may include a memory 38, a set of programs 40 storing instructions therein for shutting down the generator according to the methods described herein, and a processor(s) 42 (e.g., a microprocessor(s)) that may execute the set of programs 40 to control the operation of the system 10 using sensor inputs and instructions from human operators. Moreover, the processor 42 may include multiple microprocessors, one or more "general-purpose" microprocessors, one or more special-purpose microprocessors, and/or one or more application specific integrated circuits (ASICS), or some combination thereof.

For example, the processor 42 may include one or more reduced instruction set (RISC) processors. The control unit 36 may be coupled to the memory 38 that may store information such as control software, look up tables, configuration data, etc. In some embodiments, the processor 42 and/or the memory 38 may be external to the control unit 36. The memory 38 may include a tangible, non-transitory, machine-readable-medium, such as a volatile memory (e.g., a random access memory (RAM)) and/or a nonvolatile memory (e.g., a read-only memory (ROM)). The memory 38 may store a variety of information and may be used for various purposes. For example, the memory 38 may store the machine-readable and/or processor-executable instructions 40 (e.g., firmware or software) for the processor to execute, such as instructions for controlling the system 10. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, identification data, etc.), instructions (e.g., software or firmware), and any other suitable data. In some embodiments, the control unit 36 may generate commands to adjust valves of the combustion section 22 that regulate the fuel flow, adjust inlet guide vanes 26, maintain emissions (e.g., NOx and CO emissions) in the exhaust of the turbine section 24, schedule the gas turbine 12 (e.g., setting desired exhaust temperatures or combustor fuel splits), and activate other control settings on the gas turbine 12. The control unit 36 may control valve configurations at the fuel system 16 as well as monitor various parameters, such as pressure at the fuel system 16, gas levels in the gas turbine 12, etc.

Additionally, a set of sensors 44 may be disposed along a flow path of the system 10. The sensors 44 may monitor operation of the system 10 by measuring, for example, a temperature of the air and/or the components of the system 10 at the locations of the sensors 44. In some embodiments, one or more of the sensors 44 that may detect various observable conditions of one or more components of the gas turbine 12 (e.g., the generator 26, the intake 20, etc.) and/or the ambient environment. In some embodiments, a plurality of redundant sensors may be used to measure the same measured condition. For example, a plurality of redundant temperature sensors 44 may monitor ambient temperature surrounding the system 10, compressor discharge temperature, turbine exhaust gas temperature, and other temperature measurements of the gas stream through the system 10. For example, the temperature sensors 44 may be located at an inlet of the compressor section 20, along an exhaust region of the gas turbine 12, and/or at the exhaust stack 34 of the HRSG 14. Similarly, a plurality of redundant pressure sensors 44 may monitor ambient pressure, and static and dynamic pressure levels at the compressor section 20, exhaust stack 34, and/or at other locations in the gas stream through the system 10. A plurality of redundant sensors (not shown) may also include flow sensors, speed sensors, flame detector sensors, valve position sensors, guide vane angle sensors, humidity sensors, or the like, that sense various parameters pertinent to the operation of the system 10. The temperature sensors 44, the pressure sensors 44, and any other redundant sensors may all communicatively couple to the control unit 36.

As used herein, a "parameter" refer to a measurable and/or estimable quality that can be used to define an operating condition of the gas turbine 10, such as temperature, pressure, gas flow, or the like, at defined locations in the system 10. Some parameters are measured, i.e., are sensed and are directly known. Other parameters are estimated by a model and are indirectly known. The measured and estimated parameters may be used to represent a given turbine operating state.

The present disclosure provides methods of shutting down the system 10 in such a manner to be in a ready state for a restart (e.g., a "purge complete" condition) within a reduced amount of time from shutdown. A "purge complete" condition is a general indication that combustible gases are substantially diluted and/or removed from the system 10 and that the system 10 is in a desired state for startup of the gas turbine 12. A "purge complete" condition can also involve removal of risks associated with remaining fuel in the gas turbine 12, exhaust stack 34, and downstream equipment, placing the fuel system 16 in a specific startup configuration, completing a leak test of the fuel system 16, securing the fuel system 16 to a standby condition, and monitoring conditions after establishing the desired conditions.

Figure 2:
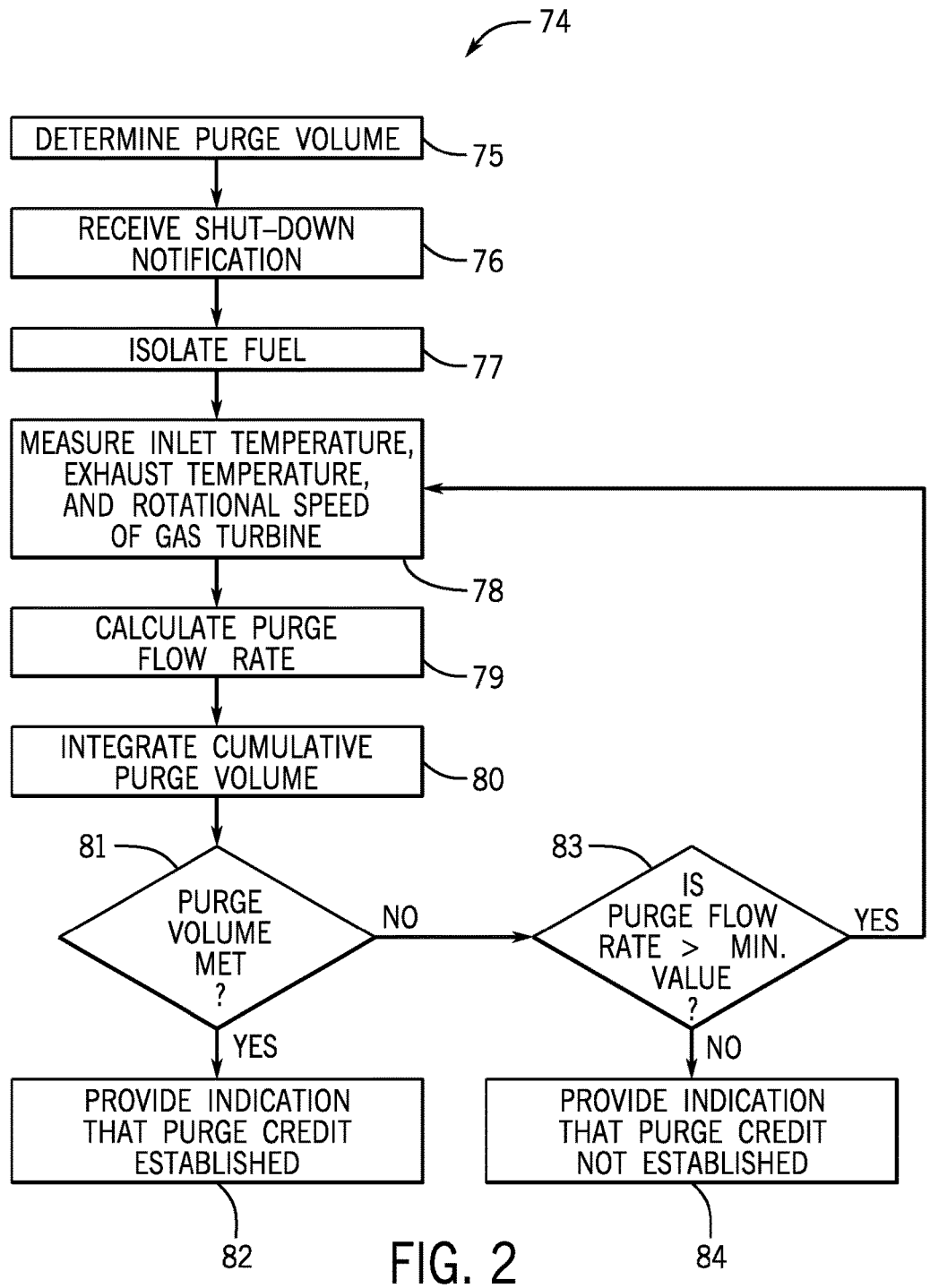
FIG. 2 is a flowchart of a method for purging a gas turbine and heat recovery steam generator during shut-down of the gas turbine and heat recovery steam generator, in accordance with embodiments described herein.

With the foregoing in mind, FIG. 2 is a method 74 for purging the system 10 during shut-down of the system 10. It may be appreciated that the blocks of method 74 are not necessarily sequential steps and that certain blocks may be performed simultaneously or in a different order. As discussed above, receiving purging credit during shut-down of the system 10 may enable a quicker restart of the system 10 as the system 10 may be in a "purge complete" condition upon completion of the shut-down. To accomplish purging during shut-down of the system 10, at block 75, the control unit 36 may determine a purge volume that achieves the purging credit. The purge volume may be a static value for the system 10, and the purge volume may be based on a volume of the HRSG 14. For example, in some embodiments, the purge volume to achieve the purging credit may be five volume exchanges of air flow that cycle through the system 10 while the gas turbine 12 operates above a minimum purging speed. A volume exchange may be defined as a volume of air flow cycled through the system 10 that is equivalent to a volume of the HRSG 14.

Subsequently, at block 76, the control unit 36 may receive a shut-down notification. The shut-down indication may be a result of a decreased power demand in a power grid coupled to the system 10. Additionally, the shut-down indication may also be a result of a manual shut-down indication or any other stimulus where a shut-down of the system 10 is desirable.

Accordingly, at block 77, the fuel may be isolated from the gas turbine 12. In isolating the fuel from the gas turbine 12, the combustion flame may be extinguished and the system 10 may provide coast down air flow through the system. The coast down air flow may refer to air flowing through the system 10 due to residual (i.e., unpowered) rotation of the buckets of the turbine section 24 and/or compressor blades of the compressor section 22 after extinguishing the combustion flame.

Additionally, it may be appreciated that isolating the fuel from the gas turbine 12 may occur at approximately 40 percent (or another percentage) of a normal operating speed of the gas turbine 12 to meet the desired purge flow volume.

Normal operating speed of the gas turbine 12 may be defined as an operating speed of the gas turbine 12 at which the gas turbine 12 is operated during standard power generating operation. However, it may also be appreciated that depending on the temperature of the exhaust and/or a magnitude of the volume that achieves the purge credit, the fuel may be isolated at greater than approximately 40 percent or less than approximately 40 percent of the normal operating speed of the gas turbine 12. In certain embodiments, the fuel may be isolated at approximately 30 to 100 percent, 30 to 65 percent, 65 to 100 percent, and all subranges therein, of the normal operating speed of the gas turbine 12. For example, the fuel may be isolated at approximately 30 percent, 35 percent, 45 percent, 50 percent, 55 percent, 60 percent, 65 percent, 70 percent, 75 percent, 80 percent, 85 percent, 90 percent, 95 percent, or 100 percent of the normal operating speed of the gas turbine 12 and still achieve the desired purge depending on the exhaust temperature at the shut-down request and the magnitude of the purge volume.

Further, the control unit 36 may determine the operating speed of the gas turbine 12 at which the fuel is isolated (i.e., isolation speed). For example, if the exhaust temperature is relatively low during a specific shut-down operation, more inlet air flow and time may be used to achieve the desired purging volume. Accordingly, the control unit 36, upon determining the desired purging volume, may instruct the system 10 to isolate the fuel from the gas turbine 12 at a higher than nominal isolation speed. Alternatively, if the exhaust temperature is relatively high during a specific shut-down operation, less inlet air flow and time may be used to achieve the desired purging volume. In such a situation, the control unit 36 may instruct the system 10 to isolate the fuel at a lesser than nominal isolation speed. In other words, the greater the exhaust temperature during the specific shut-down operation, the lower the isolation speed needed when isolating the fuel. In this manner, the control unit 36 is able to account for various speeds of the gas turbine 12 during a shut-down operation to meet the desired purging volume of the purging operation. In certain embodiments, the control unit 36 may utilize at least in part historical data (e.g., historical margins for meeting the purge credit parameters) to determine the isolation speed as described in greater detail below.

At block 78, inlet temperatures, exhaust temperatures, and the rotational speed of the gas turbine 12 are measured. Measuring the inlet temperatures and exhaust temperatures enables the control unit 36 to accurately account for purge volumes based on increased temperature of the gas flowing through the system 10. For example, during shut-down of the system 10, a temperature difference between the exhaust temperature and the inlet temperature indicates that the warmer exhaust temperature would result in the expansion of air initially provided at an inlet of the compressor section 20 of the gas turbine 12 or any other inlet location of the gas turbine 12. Accordingly, with expansion of the air at the inlet temperature, less compressor inlet flow is used to complete the purge requirement. That is, less compressor inlet flow is used to generate a flow to adequately meet the purge credit volume of air. The values measured in block 78 are continuously monitored during the shut-down operation to maintain accurate measurements of the purging flow passing through the system 10.

Subsequently, at block 79, a purge flow rate may be calculated based on the exhaust and inlet temperature measurements and the measurements of the rotational speed of the gas turbine 12. As described above, a relationship in temperature between the exhaust and the inlet air flow may provide an indication as to the amount that the inlet air flow expands as the inlet air flow travels along a gas flow path of the gas turbine 12. Accordingly, the temperatures at the inlet and/or the exhaust of the gas turbine 12, in addition to the rotational speed of the gas turbine 12, may enable a calculation of an accurate purge flow rate of the system 10.

To achieve adequate purge to restart the system 10, a certain number of volume exchanges (e.g., 4, 5, etc.) of air flow may cycle through the system while buckets of the gas turbine 12 and/or blades of the compressor section 20 provide a flow rate at a rate greater than a certain percent (e.g., eight percent or another percent) of the flow rate of the gas turbine 12 during standard operation. In some embodiments, the percent flow rate may be greater or less during standard operation based on the properties of the gas turbine 12. That is, a purging volume that achieves the adequate purge may be defined as a certain number of volume exchanges of air flow that cycle through the system. The number of volume exchanges may be determined by requirements by the original equipment manager or industrial codes that reference a certain number of exchanges of a defined volume of equipment in a gas path of the gas turbine or a rate. The volume of air flow may be a defined volume of the HRSG 14 through which air flows. Based on the expansion of the inlet air flow, less inlet air flow may be used to achieve the certain number of volume exchanges of air flow through the system. Accordingly, the control unit 36 may calculate an amount of inlet air flow that achieves the exhaust flow to meet the desired purge credit value. Alternatively, the exhaust flow may be calculated by the control unit 36 based on the temperature sensors 44 at the inlet, at the exhaust of the turbine section 24, and/or along a flow path through the HRSG 14. This calculation may provide an indication of a point in time after securing the fuel at which the desired purge is achieved based on the air flow at the exhaust of the system 10. That is, the control unit 36 may determine an amount of time used to achieve the desired purging volume based on the inlet and exhaust temperature of the system 10, the speed of the buckets of the gas turbine 12 and/or the blades of the compressor section 20, and the volume of the HRSG 20.

By way of example, in comparing mass flow of the exhaust air flow at ambient temperatures (e.g., purging during system start-up) and mass flow of the exhaust at 300-400 degrees Celsius (e.g., purging during system shut-down), the volume may be increased by approximately 30-40 percent with the heightened temperature values. That is, it may take approximately 30-40 percent less time for the system 10 to achieve the desired purge at shut-down than it does for the system 10 to achieve the desired purge during start-up. Accordingly, in establishing the purge at shut-down, the system 10 may be brought back online much faster than when the system 10 establishes the purge at start-up.

With this in mind, at block 80, a cumulative purged volume may be integrated. That is, the control unit 36 may track a volume of the purge flow that has been accumulated from the system 10. For example, each time block 80 is executed, the control unit 36 may update the cumulative purged volume based on current inlet temperatures, exhaust temperatures, and/or rotational speeds of the gas turbine 12. Accordingly, the control unit 36 may keep track of when the purge volume is met.

At decision block 81, the control unit 36 may make the determination of whether the purge volume has been met by the system 10. If the purge volume has been met, at block 82, the control unit 36 may indicate that the purge has been established. By indicating that the purge has been established, the control unit 36 may not instruct the system 10 to perform another purge operation when the system 10 is restarted.

If the purge volume has not been met at decision block 81, then the control unit, at decision block 83, may determine if the purge flow rate is greater than the minimum purge flow requirement. If the purge flow rate is greater than the minimum purge flow requirement, then the method 74 returns to block 78, and the loop may continue until the purge volume is met at decision block 81 or the purge flow rate is less than the minimum purge flow requirement at decision block 83. When the purge flow rate is less than the minimum purge flow requirement at decision block 83, the control unit 36 may indicate that the purge has not been established at block 84. Accordingly, when the system 10 is restarted, the system 10 may be instructed by the control unit 36 to undergo a partial purging operation to achieve the remaining purge volume to establish the purge, or the control unit 36 may restart the system 10 after undergoing a complete purging operation.

Figure 3:
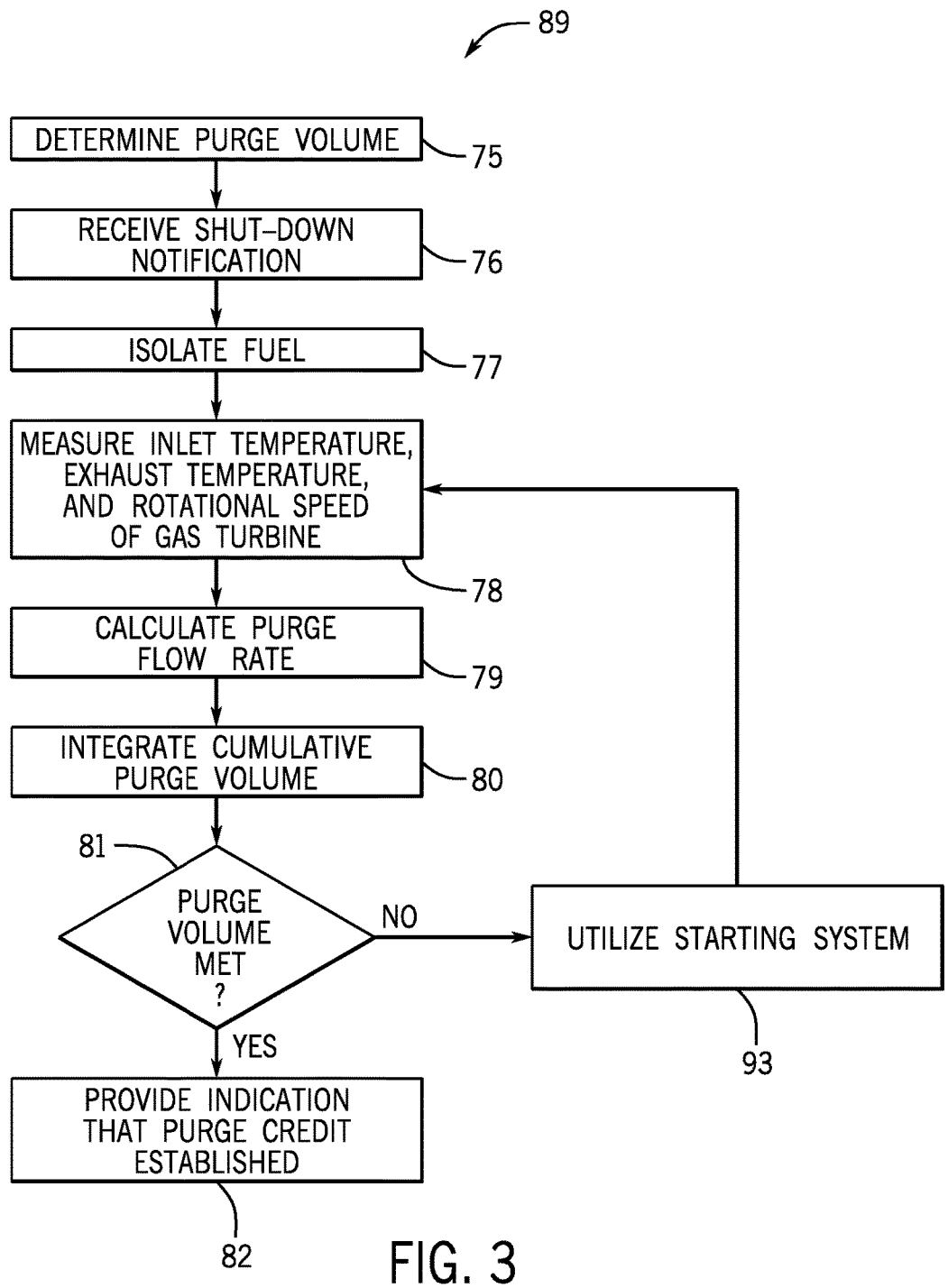
FIG. 3 is a flowchart of another method for purging a gas turbine and heat recovery steam generator during shut-down of the gas turbine and heat recovery steam generator, in accordance with embodiments described herein.

FIG. 3 is an alternative embodiment of a method 89 for purging the system 10 during shut-down of the system 10. Method 89 is similar to method 74 with the exception what happens if the purge volume has not been met at decision block 81. If the purge volume has not been met at decision block 81 in method 89, then, at block 93, the control unit 36 may utilize a starting system (e.g., static starting system such as a load commutated inverter (LCI), electric motor starting package, diesel engine starting package, etc.) to maintain the gas turbine engine 12 at or above a minimum purge flow speed (while the method 89 returns to block 78 so the loop may continue) until the purge volume is met at decision block 81.

Figure 4:
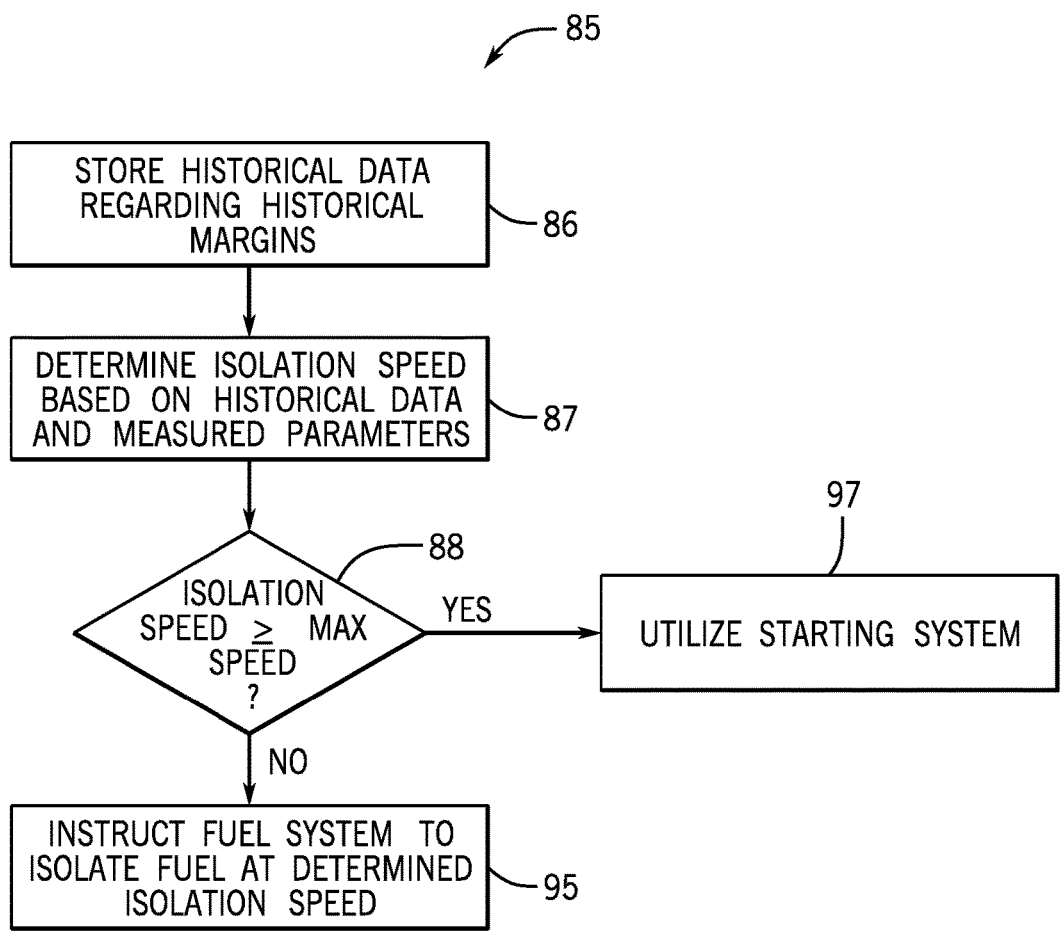
FIG. 4 is a flowchart of a method for determining an isolation speed of the gas turbine during shut-down of the gas turbine and heat recovery steam generator, in accordance with an embodiment of the present disclosure.

As discussed above, in some embodiments, the control unit 36, at block 78, may control when the fuel is isolated from the gas turbine 12 based on historical margins for meeting the purge credit parameters. Accordingly, FIG. 4 is a method 85 for determining when the fuel is isolated from the gas turbine 12. At block 86, historical data may be stored in the memory 38 of the control unit 36. The historical data may relate to historical amounts of accumulated volume and/or margins to the required volume taken by the gas turbine 12 under various conditions (e.g., inlet temperature, exhaust temperature, and isolation speed) to reach a minimum purge flow requirement of the gas turbine 12.

Using the historical data, at block 87, the control unit 36 may determine (e.g., actively learn) an isolation speed of the gas turbine 12 at which the gas turbine 12 may achieve the purge prior to the gas turbine 12 reaching the minimum purge flow requirement. That is, the control unit 36 may use the historical data stored in the memory 38, in combination with the current operating parameters of the gas turbine 12 (e.g., inlet temperature, exhaust temperature, and rotational speed), to determine an isolation speed of the gas turbine 12 at which the fuel is isolated from the gas turbine 12. Such a determination may enable greater precision in ensuring that the purge is achieved because the speed at which the fuel is isolated may be a speed that historically keeps the gas turbine 12 above the minimum purge flow requirement for long enough to achieve the purge. In certain embodiments, the control unit 36 may store the determined isolation speed (e.g., in memory 38). The stored isolation speed may be utilized in subsequent purge operations. In some embodiments, the stored isolation speed may be modified and/or updated by the control unit 36. It should be noted that besides purge volume other factors may affect isolation speed. In particular, the isolation speed may vary between different gas turbines.

At decision block 88, the control unit 36 may compare the determined isolation speed to a maximum speed (e.g., determined by the hardware limits). If the determined isolation speed is not greater than or equal to the maximum speed then, at block 95, the control unit 36 may instruct the fuel system 16 to isolate the fuel at the speed determined at block 87. If the determined isolation speed is less than the maximum speed, then at block 97 the control unit 36 may utilize the starting system (e.g., static starting system such as a load commutated inverter (LCI), electric motor starting package, diesel engine starting package, etc.) to maintain the gas turbine engine 12 at or above a minimum purge flow speed.

Because the control unit 36 takes into account temperature to determine the desired purge volume, the air flow through the system is minimized and thermal stresses on the equipment of the system 10 are reduced. Further, sensor based air flow calculations may provide a more consistent approach to purging the system 10. For example, instead of purging a certain number of volumes (e.g., five volumes) of ambient air temperature input into the system 10 during each purging operation, the control unit 36 determines the actual air flow through the system 10 taking expanding gas volumes of heated ambient air into account. Accordingly, each purging operation purges an exhaust volume that more accurately matches a desired purge volume to achieve purge.

Figure 5:
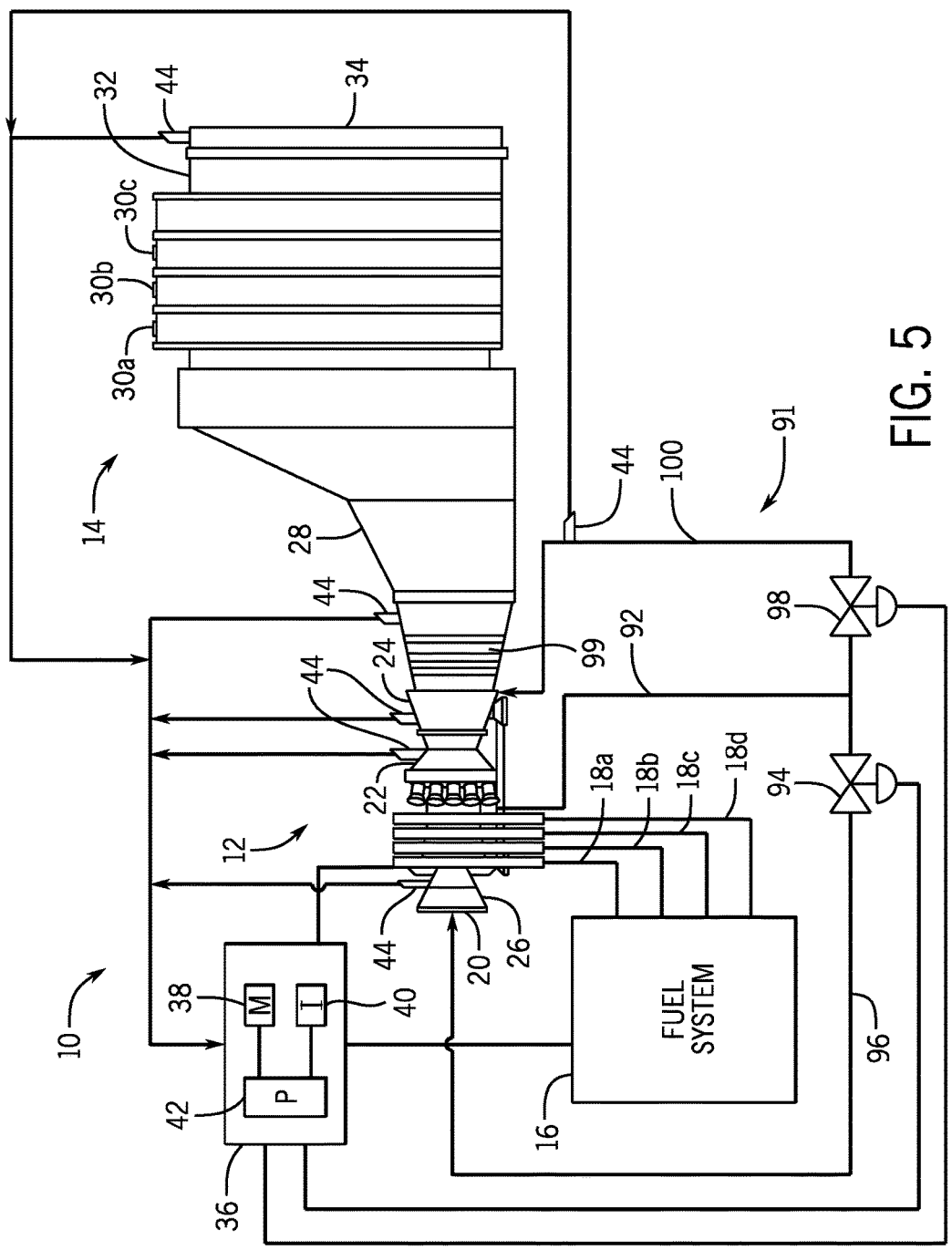
FIG. 5 is a block diagram of a gas turbine and heat recovery steam generator with inlet bleed heating valves used to generate power in a combined cycle power plant, in accordance with embodiments described herein.

FIG. 5 is a block diagram of the system 10 (e.g., a power generation system) including the gas turbine 12 and the heat recovery steam generator (HRSG) 14, which is generally used to generate power in a combined cycle power plant. The system 10 includes the gas turbine 12, the heat recovery steam generator (HRSG) 14, and the fuel system 16. Generally, the system 10 of FIG. 5 may operate in a similar manner during a purging process of a shut-down operation to the system 10 described in FIG. 1 with a modification to an inlet bleed heating system 91 of the gas turbine 12.

For example, the inlet bleed heating system 91 of the gas turbine 12 may relieve pressure in the compressor section 20 and increase a temperature of fluid provided to the inlet of the compressor section 20. By relieving the pressure and increasing the temperature, the inlet bleed heating system 91 may protect the compressor section 20 from stalling. The inlet bleed heating system 91 may bleed heated compressor discharge from the compressor section 20 by way of a fluid flow line 92. Generally the fluid flow line 92 may couple to an inlet bleed heating valve 94 that provides the heated compressor discharge to the inlet of the compressor section 20 by way of a fluid flow line 96. The inlet bleed heating valve 94 may be controlled by the control unit 36 to increase or decrease the heated compressor discharge from the compressor section 20 to the inlet of the compressor section 20.

Additionally, extraction valve 98 may be coupled to the fluid flow line 92 to provide heated compressor discharge to an exhaust plenum 99 of the turbine section 24 by way of a fluid flow line 100. During a purging operation, the additional inlet bleed heating valve 98 may be at least partially opened to provide at least a portion of the heated compressor discharge to the exhaust plenum 99 of the gas turbine 12. By applying the heated compressor discharge to the exhaust plenum 99, additional purging volume flow is provided in addition to the coast down purge flow to the HRSG 14 provided from the inlet of the compressor section 20. For example, the heated compressor discharge lowers the compressor operating line, increase the compressor inlet flow, and therefore the total flow into HRSG 14. The additional purging volume flow may be determined by the control unit 36 via volume accumulation instructions or a model. The determination of the additional purging volume flow may be based on discharge extraction stroke, measured flow, and/or a change in the compressor pressure ratio. This operation would have may be useful at low speeds due to compressor speed line shapes. In addition to increasing total flow, it would lower the speed at which the system 10 reaches the minimum flow, further increasing the total accumulated flow. Because the system 10 may include a minimum flow requirement for the purge operation, the addition of the heated compressor discharge from the inlet bleed heating system 14 to the exhaust plenum 99 may provide a sufficient increase in the purge flow for the system 10 to achieve the desired purge credit volume of air during a shut-down operation of the system 10.

Further, it may be appreciated that the valves 94 and 98 may generally be closed during a shut-down operation of the system 10. Therefore, during shut-down operations, an operating line, which may be defined as a compressor pressure ratio at a purging flow rate, of the compressor section 20 may generally be greater than when one or both of the valves 94 and 98 are opened. The heightened operating line may result in increased pressure within the compressor section 20, which may provide sufficient resistance to drive down a speed of the compressor blades during a shut-down operation to a level below a speed that provides an adequate purging flow rate. Accordingly, by opening one or both of the valves 94 and 98, the speed of the compressor blades during a shut-down operation may not decrease as fast as when the valves 94 and 98 are closed. Additionally, when the valve 98 is opened, the operating line of the compressor section 20 may be reduced (decreasing the compressor pressures), and the heated compressor discharge provided from the compressor section 20 to the exhaust plenum 99 may provide an increase to the purging flow rate (increasing the total flow, while creating less resistance and a slower deceleration) to enable the desired purge credit volume to be reached in a shorter amount of time. Moreover, because directing the heated compressor discharge to the exhaust plenum 99 reduces the operating line of the compressor section 20 and increases purge flow volume provided to the exhaust plenum 99, the system 10 may reduce an amount of time the starting system (e.g., static starting system such as a load commutated inverter (LCI), electric motor starting package, diesel engine starting package, etc.) to maintain the gas turbine engine 12 at or above a minimum purge flow speed. Additionally, in some embodiments, the system 10 may eliminate the use of the starting system during a purging operation altogether. With the system 10, the starting system may provide power to the system 10 upon starting the gas turbine 12, or to maintain the gas turbine 12 above a minimum purging flow rate when the gas turbine 12 is shut down.

Figure 6:
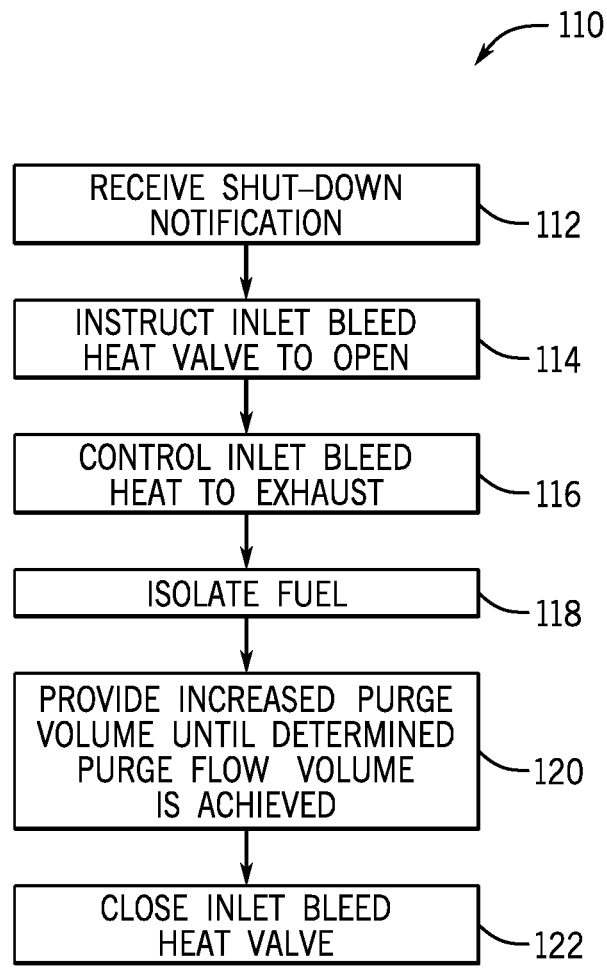
FIG. 6 is a flowchart of a method for purging a gas turbine and heat recovery steam generator during shut-down by controlling inlet bleed heating valves, in accordance with embodiments described herein.

Turning now to FIG. 6, a flowchart of a method 110 for purging the system 10 during shut-down using the inlet bleed heating system 91 is illustrated. It may be appreciated that the blocks of the method 110 are not necessarily sequential steps and that certain blocks may be performed simultaneously or in a different order. As discussed above, receiving purging credit during shut-down of the system 10 may enable a quicker restart of the system 10, as the system 10 may be in a "purge complete" condition upon completion of the shut-down. To accomplish purging during shut-down of the system 10, at block 112, the control unit 36 may receive a shut-down notification. The shut-down notification may be a result of a decreased power demand in a power grid coupled to the system 10. Additionally, the shut-down notification may also be a result of a manual shut-down notification or any other stimulus where a shut-down of the system 10 is desirable.

Subsequently, at block 114, the control unit 36 may instruct the inlet bleed heat valves 94 and/or 98 to open or to remain open. By controlling the valves 94 and/or 98 to open or to remain open, the heated compressor discharge may be transmitted to the inlet of the compressor section 20 and/or the exhaust plenum 99 of the gas turbine 12. In particular, the control unit 36, at block 116, may control the heated compressor discharge to the exhaust plenum 99 to lower the operating line of the gas turbine 12 and to increase the total purge flow as a result of increased pressure in the compressor section 20. Further, returning the heated compressor discharge to the exhaust plenum 99 may provide additional purge volume to assist in meeting the desired purge volume credit. It may be appreciated that in some embodiments, the valve 94 may remain closed while the valve 98 is open during a purging operation.

At block 118, the fuel may be isolated from the gas turbine 12. In certain embodiments, other components of the system may be isolated. In isolating the fuel from the gas turbine 12, the combustion flame may be extinguished and the system 10 may provide coast down air flow through the system in addition to the heated compressor discharge provided by the valve 98 of the inlet bleed heating system 91. The coast down air flow may refer to air flowing through the system 10 due to residual (i.e., unpowered) rotation of the buckets of the turbine section 24 and/or compressor blades of the compressor section 22 after extinguishing the combustion flame.

Additionally, it may be appreciated that isolating the fuel from the gas turbine 12 may occur at approximately 40 percent (or another percentage) of a normal operating speed of the gas turbine 12 to meet the desired purge flow volume. In certain embodiments, the fuel may be isolated at approximately 30 to 100 percent, 30 to 65 percent, 65 to 100 percent, and all subranges therein, of the normal operating speed of the gas turbine 12. For example, the fuel may be isolated at approximately 30 percent, 35 percent, 45 percent, 50 percent, 55 percent, 60 percent, 65 percent, 70 percent, 75 percent, 80 percent, 85 percent, 90 percent, 95 percent, or 100 percent of the normal operating speed of the gas turbine engine 12. Normal operating speed of the gas turbine 12 may be defined as an operating speed of the gas turbine 12 at which the gas turbine 12 is operated during standard power generating operation. However, it may also be appreciated that depending on the temperature of the exhaust, a magnitude of the volume that achieves the purge, and/or the purge flow provided by the heated compressor discharge, the fuel may be isolated at greater than a nominal isolation speed or less than a nominal isolation speed. In certain embodiments, the fuel may be isolated at approximately 30 to 100 percent, 30 to 65 percent, 65 to 100 percent, and all subranges therein, of the normal operating speed of the gas turbine 12. For example, the fuel may be isolated at approximately 30 percent, 35 percent, 45 percent, 50 percent, 55 percent, 60 percent, 65 percent, 70 percent, 75 percent, 80 percent, 85 percent, 90 percent, 95 percent, or 100 percent of the normal operating speed of the gas turbine 12. For example, the fuel may be isolated at the certain percent of the normal operating speed of the gas turbine 12 and still achieve the desired purge depending on the exhaust temperature at the shut-down request and the magnitude of the purge volume.

Further, the control unit 36 may determine the operating speed of the gas turbine 12 at which the fuel is isolated. For example, if the exhaust temperature is relatively low during a specific shut-down operation, more inlet air flow and time may be used to achieve the desired purging volume. Accordingly, the control unit 36, upon determining the desired purging volume, may instruct the system 10 to isolate the fuel from the gas turbine 12 at an isolation speed as described above. Alternatively, if the exhaust temperature is relatively high during a specific shut-down operation, less inlet air flow and time may be used to achieve the desired purging volume. In such a situation, the control unit 36 may instruct the system 10 to isolate the fuel at approximately 30 percent of the normal operating speed of the gas turbine 12. In this manner, the control unit 36 is able to account for various speeds of the gas turbine 12 during a shut-down operation to meet the desired purging volume of the purging operation.

As the system 10 coasts down, at block 120, an increased purge volume is applied to the system 10 until the determined purge credit volume is achieved. That is, the valve 98 may remain open until the determined purge credit volume is achieved by the system 10. Accordingly, a speed of the compressor blades may maintain a speed above the minimum purge flow velocity for a sufficient amount of time to meet the purge credit volume.

Subsequently, upon reaching the purge credit volume, at block 122, the inlet bleed heat valves 94 and/or 98 may be closed or may remain closed. By closing the valves 94 and 98, the operating line of the compressor section 20 may increase, which may result in the speed of the compressor blades of the compressor section 20 to quickly decrease. Therefore, the system 10 may quickly shut-down after the desired purge credit volume is met.

Figure 7:
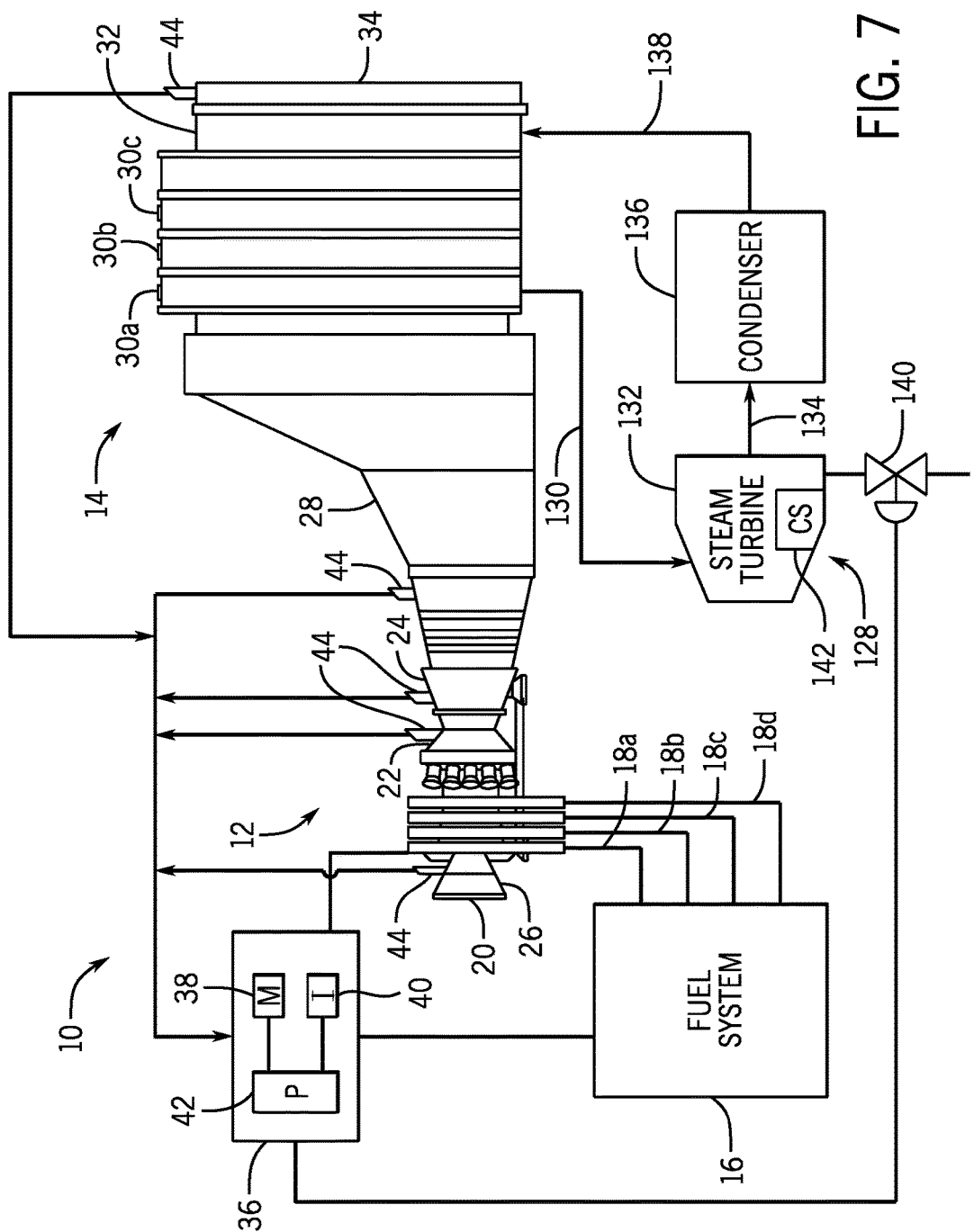
FIG. 7 is a block diagram of a gas turbine, a heat-recovery steam generator, and a steam turbine used to generate power in a combined cycle power plant, in accordance with embodiments described herein.

FIG. 7 is a block diagram of the system 10 (e.g., a power generation system) including the gas turbine 12 and the heat recovery steam generator (HRSG) 14, which is generally used to generate power in a combined cycle power plant. The system 10 includes the gas turbine 12, the heat recovery steam generator (HRSG) 14, the fuel system 16, and a steam turbine system 128. Generally, the system 10 of FIG. 7 may operate in a similar manner during a purging process of a shut-down operation to the system 10 described in FIG. 1 with modifications to operation of the steam turbine system 128 to increase the purging volume flow during coast down of the system 10. In addition, the system 10 may include systems on the HRSG 14 or back up fuel systems that may be involved in the isolation.

In particular, the steam turbine system 128 may receive steam from the HRSG 14 by way of a steam transport line 130. The steam may provide a propulsive force on a steam turbine 132 of the steam turbine system 128 to generate power. From the steam turbine 132, the steam may travel, by way of an additional steam transport line 134, to a condenser 136. In the condenser 136, the steam may be cooled and condensed to water and transported back to the HRSG 14 by way of a water transport line 138.

It may be appreciated that, in some embodiments, the steam turbine 132 and the gas turbine 12 may both be a part of a single shaft generator system. That is, both the steam turbine 132 and the gas turbine 12 generate power from the same shaft of a generator system. Further, reducing back pressure of a condenser of the steam turbine 132 may reduce steam turbine drag on the shaft. By reducing the back pressure of the condenser of the steam turbine 132 during a shut-down operation of the system 10, which includes the steam turbine 132, the deceleration of the purge flow during coast down of the system 10 may be slowed. For example, by limiting the drag provided by the steam turbine 132 on the shaft, the system 10 will take a longer amount of time to decelerate to the minimum purge flow rate. Accordingly, the system 10 may achieve the desired purge flow credit without having to hold the system 10 at the minimum purge flow rate with the starting system. Additionally, in some embodiments, the system 10 may achieve the desired purge flow credit by reducing the back pressure of the condenser of the steam turbine 132 to reduce an amount of time during which the starting system holds the system 10 at the minimum purge flow rate. The back pressure of the condenser of the steam turbine 132 via managing (via the control unit 36) components of the steam turbine 132 (e.g., steam valve 140, cooling and sealing air system 142, etc.).

Figure 8:
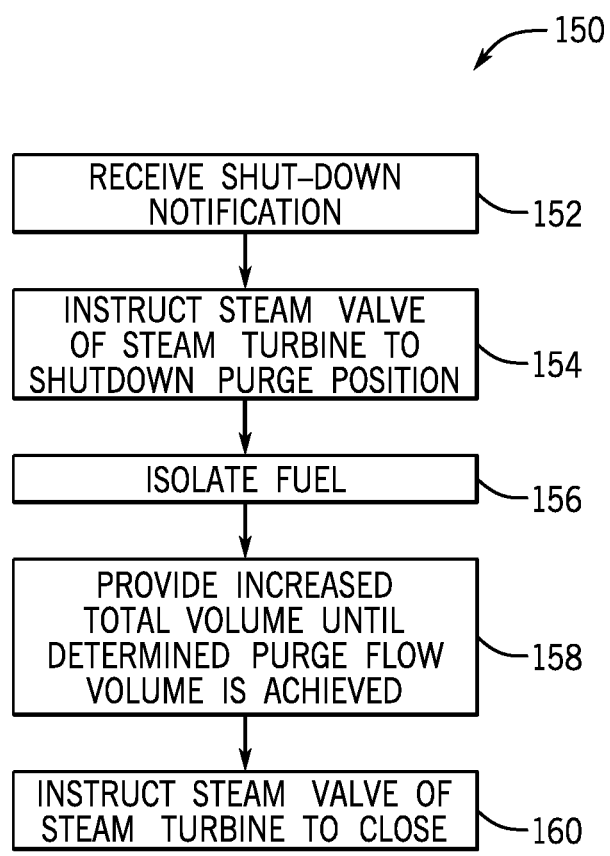
FIG. 8 is a flowchart of a method for purging a gas turbine and heat recovery steam generator during shut-down by controlling a steam valve of a steam turbine, in accordance with embodiments described herein.

Turning now to FIG. 8, a flowchart of a method 150 for purging the system 10 during shut-down using the steam turbine system 128 is illustrated. It may be appreciated that the blocks of the method 150 are not necessarily sequential steps, but may be performed simultaneously or in any order. As discussed above, purging during shut-down of the system 10 may enable a quicker restart of the system 10 as the system 10 may be in a purged condition upon completion of the shut-down. To accomplish purging during shut-down of the system 10, at block 152, the control unit 36 may receive a shut-down notification. The shut-down notification may be a result of a decreased power demand in a power grid coupled to the system 10. Additionally, the shut-down notification may also be a result of a manual shut-down notification or any other stimulus where a shut-down of the system 10 is desirable.

Subsequently, at block 154, the control unit 36 may instruct the steam valve 140 of the steam turbine 132 to be in a shutdown purge position. Additionally or alternatively, the control unit 36 may instruct the cooling and sealing air system 142 to open to a maximum flow capacity. By controlling the steam valve 140 and/or the cooling and sealing air system 142 to open or to remain open, the back pressure of the condenser of the steam turbine 132 may be relieved. By relieving the back pressure of the condenser, drag on a shaft of the steam turbine 132 resulting from the back pressure of the condenser may be reduced. Additionally, in a single shaft system (e.g., with both the gas turbine 12 and the steam turbine 132 driving the same shaft coupled to the generator), reducing the drag on the shaft may slow the deceleration of the purge flow of the system 10 during the shut-down operation.

At block 156, the fuel may be isolated from the gas turbine 12. In isolating the fuel from the gas turbine 12, the combustion flame may be extinguished and the system 10 may provide coast down air flow through the system 10. The coast down air flow may refer to air flowing through the system 10 due to residual (i.e., unpowered) rotation of the buckets of the turbine section 24, the compressor blades of the compressor section 22, and/or the buckets and compressor blades of the steam turbine 132 after extinguishing the combustion flame.

Additionally, it may be appreciated that isolating the fuel from the gas turbine 12 may occur at approximately 40 percent (or another percentage) of a normal operating speed of the gas turbine 12 to meet the desired purge flow volume. Normal operating speed of the gas turbine 12 may be defined as an operating speed of the gas turbine 12 at which the gas turbine 12 is operated during standard power generating operation. However, it may also be appreciated that depending on the temperature of the exhaust, a magnitude of the volume that achieves the purge, and/or the deceleration of the purge flow of the system 10, the fuel may be isolated at greater than a nominal isolation speed or less than a nominal isolation speed. In certain embodiments, the fuel may be isolated at approximately 30 to 100 percent, 30 to 65 percent, 65 to 100 percent, and all subranges therein, of the normal operating speed of the gas turbine 12. For example, the fuel may be isolated at approximately 30 percent, 35 percent, 45 percent, 50 percent, 55 percent, 60 percent, 65 percent, 70 percent, 75 percent, 80 percent, 85 percent, 90 percent, 95 percent, or 100 percent of the normal operating speed of the gas turbine 12 and still achieve the desired purge depending on the exhaust temperature at the shut-down request, the magnitude of the purge volume, and the deceleration of the purge flow of the system 10.

Further, the control unit 36 may determine the operating speed of the gas turbine 12 at which the fuel is isolated. For example, if the exhaust temperature is relatively low during a specific shut-down operation, more inlet air flow and time may be used to achieve the desired purging volume. Accordingly, the control unit 36, upon determining the desired purging volume, may instruct the system 10 to isolate the fuel from the gas turbine 12 at a certain percent of the normal operating speed of the gas turbine 12. Alternatively, if the exhaust temperature is relatively high during a specific shut-down operation, less inlet air flow and time may be used to achieve the desired purging volume. In such a situation, the control unit 36 may instruct the system 10 to isolate the fuel at approximately 30 percent of the normal operating speed of the gas turbine 12. In this manner, the control unit 36 is able to account for various speeds of the gas turbine 12 during a shut-down operation to meet the desired purging volume of the purging operation.

As the system 10 coasts down toward the minimum purging flow rate, at block 158, an increased total volume is applied to the system 10 until the determined purge credit volume is achieved. That is, the steam valve 140 and/or the cooling and sealing air system 142 may remain fully open until the determined purge credit volume is achieved by the system 10. In particular, opening the steam valve 140 and/or cooling and sealing air system slows the deceleration of the train resulting in more total volume before reaching the minimum purge flow. Accordingly, a speed of the compressor blades of the compressor section 20 may maintain a speed above the minimum purge flow velocity for a sufficient amount of time to meet the purge credit volume.

Subsequently, upon reaching the purge credit volume, at block 160, the steam valve 140 and/or the cooling and sealing air system 142 may be closed or may remain closed. By closing the steam valve 140 and the cooling and sealing air system 142, the drag on the shaft may increase, which may result in the speed of the compressor blades of the compressor section 20 to quickly decrease. Therefore, the system 10 may quickly shut-down after the desired purge credit volume is met.

Figure 9:
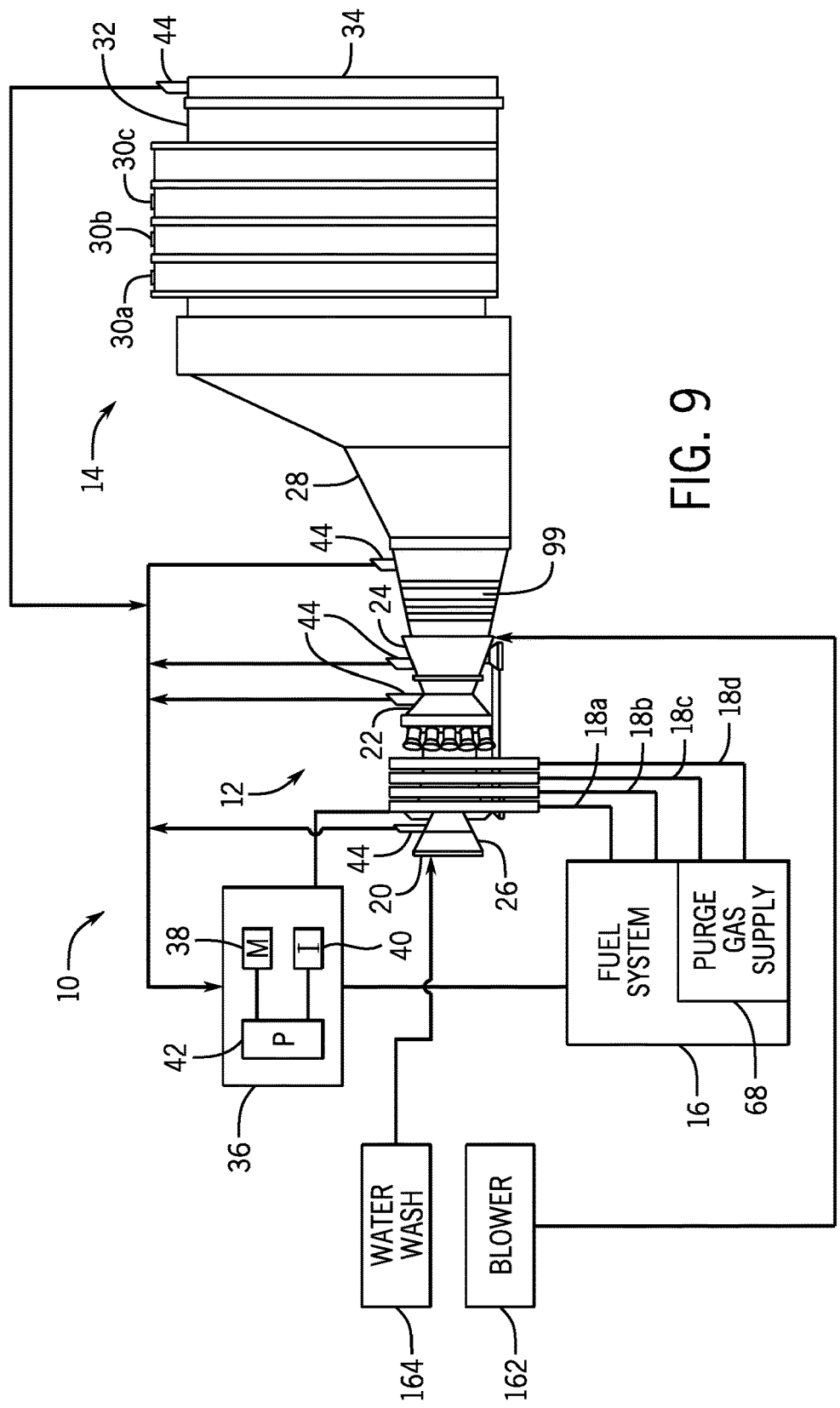
FIG. 9 is a block diagram of a gas turbine and heat-recovery steam generator with fluid flow contributing components used to generate power in a combined cycle power plant, in accordance with embodiments described herein.

FIG. 9 is a block diagram of the system 10 (e.g., a power generation system) including the gas turbine 12 and the heat recovery steam generator (HRSG) 14, which is generally used to generate power in a combined cycle power plant. The system 10 includes the gas turbine 12, the heat recovery steam generator (HRSG) 14, the fuel system 16, a blower 162, and a water wash system 164. Generally, the system 10 of FIG. 9 may operate in a similar manner during a purging process of a shut-down operation to the system 10 described in FIG. 1 with modifications to operation of the gas turbine 12 and/or the fuel system 16 to increase the purging volume flow during coast down of the system 10.

In particular, the system 10 may increase a purging flow through the system 10 using various sources of air (e.g., the blower 162) to boost inlet pressure of the gas turbine 12. For example, the blower 162 may provide increased air flow at an aft portion of the turbine section 24. The increased air flow may provide increased purging air flow to the system 10 during coast down of the system 10 in such a manner that the desired purge flow credit is achieved in a reduced amount of time. In this manner, the system 10 may achieve the desired purge flow credit before the system 10 decelerates to the minimum purge flow rate. Further, the blower 162 may be any fan or air supply system that can provide increased air flow to the aft portion of the turbine section 24. Additionally, in some embodiments, the blower 162 may be an exhaust frame blower of the gas turbine 12. In such an embodiment, the blower 162 may be incorporated in the system 10 without adding any additional components.

Further, using the water wash system 164 may also increase a purging flow through the system 10. Generally, the water wash system 164 may be used to clean compressor blades of the compressor section 20 by spraying water into the inlet of the compressor section 20 while the compressor section 20 runs at a reduced speed. Because the compressor section 20 operates at a high temperature, the water sprayed into the compressor section 20 may vaporize and exit the compressor section 20 as water vapor. Accordingly, while air flow at the inlet of the compressor section 20 is not changed, increased volume resulting from vaporized water is provided to the exhaust plenum 99. The water wash system 164 may generally begin applying water to the inlet of the compressor section 20 when the fuel of the gas turbine 12 is secured (e.g., at approximately 80-90% of the normal operating speed of the gas turbine 12), and the water wash system 164 may stop providing water to the inlet of the compressor section 20 when the gas turbine 12 reaches a minimum speed beyond which the water would stop vaporizing. Accordingly, the control unit 36 may instruct the water wash system 164 to cease water wash operations when the gas turbine 12 reaches approximately 40, 50, or 60 percent of the normal operating speed of the gas turbine 12. The increased volume provided by the water vaporization may be used during the purging process to account for a portion of the desired purge flow credit when the system 10 shuts down. Therefore, the system 10 may achieve the desired purge flow credit before the system 10 decelerates to the minimum purge flow rate.

Additionally, in some embodiments, the fuel system 16 may also be used to increase the purging flow through the system 10. Generally, the fuel system 16 may provide an operation that extinguishes the combustion flame. For example, the fuel system 16 may isolate the fuel source from the gas turbine 12 by closing one or more valves (e.g., gas control valves, stop valves, etc.). Further, the fuel system 16 may provide a diluent (i.e., a displacement gas) from a displacement gas supply to the gas turbine 12 to further dilute any remaining fuel in the gas turbine 12 after the combustion flame is extinguished. It may be appreciated that the diluents from the displacement gas supply may provide additional purging flow to the system 10 when the valves of the fuel system 16 are in a specific configuration. The additional purging flow may enable the system 10 to achieve the desired purge flow credit before the system 10 decelerates to the minimum purge flow rate.

While the addition of purging air flow from the blower 162, increased volume from the water wash system 164, and/or increased purging flow from a displacement gas supply of the fuel system 16 may enable the system 10 to achieve the desired purge flow credit before the system 10 decelerates to the minimum purge flow rate, these additional purge flows may also limit an amount of time that the starting system is applied to the system to achieve the desired purge flow credit. For example, by increasing a purging flow volume over the time the gas turbine 12 takes to decelerate to the minimum purge flow rate, more total volume is purged over that time. Accordingly, the starting system may be used for a smaller amount of time to finish the purging operation when the desired purge flow credit is not reach before the gas turbine 12 decelerates to the minimum purge flow.

Figure 10:
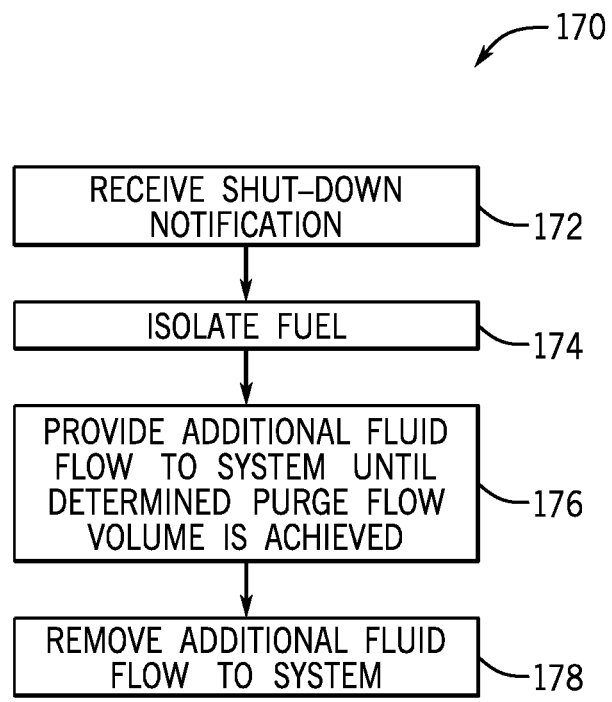
FIG. 10 is a flowchart of a method for purging a gas turbine and heat recovery steam generator during shut-down by controlling fluid flow contributing components to increase fluid flow through the gas turbine and heat recovery steam generator, in accordance with embodiments described herein.

Turning now to FIG. 10, a flowchart of a method 170 for purging the system 10 during shut-down using additional purging air flow is illustrated. It may be appreciated that the blocks of the method 170 are not necessarily sequential steps and that certain blocks may be performed simultaneously or in a different order. As discussed above, receiving purging credit during shut-down of the system 10 may enable a quicker restart of the system 10 as the system 10 may be in a "purge complete" condition upon completion of the shut-down. To accomplish purging during shut-down of the system 10, at block 172, the control unit 36 may receive a shut-down notification. The shut-down notification may be a result of a decreased power demand in a power grid coupled to the system 10. Additionally, the shut-down notification may also be a result of a manual shut-down notification or any other stimulus where a shut-down of the system 10 is desirable.

Subsequently, at block 174, the control unit 36 may instruct the fuel to be isolated from the gas turbine 121n isolating the fuel from the gas turbine 12, the combustion flame may be extinguished and the system 10 may provide coast down air flow through the system 10. The coast down air flow may refer to air flowing through the system 10 due to residual (i.e., unpowered) rotation of the buckets of the turbine section 24, the compressor blades of the compressor section 22, and/or the buckets and compressor blades of the steam turbine 132 after extinguishing the combustion flame.

Additionally, it may be appreciated that isolating the fuel from the gas turbine 12 may occur at approximately 40 percent (or other percentage) of a normal operating speed of the gas turbine 12 to meet the desired purge flow volume. Normal operating speed of the gas turbine 12 may be defined as an operating speed of the gas turbine 12 at which the gas turbine 12 is operated during standard power generating operation. However, it may also be appreciated that depending on the temperature of the exhaust, a magnitude of the volume that achieves the purge, and/or the deceleration of the purge flow of the system 10, the fuel may be isolated at greater than a nominal isolation speed or less than a nominal isolation speed. In certain embodiments, the fuel may be isolated at approximately 30 to 100 percent, 30 to 65 percent, 65 to 100 percent, and all subranges therein, of the normal operating speed of the gas turbine 12. For example, the fuel may be isolated at approximately 30 percent, 35 percent, 45 percent, 50 percent, 55 percent, 60 percent, 65 percent, 70 percent, 75 percent, 80 percent, 85 percent, 90 percent, 95 percent, or 100 percent of the normal operating speed of the gas turbine 12 and still achieve the desired purge depending on the exhaust temperature at the shut-down request, the magnitude of the purge volume, and the deceleration of the purge flow of the system 10.

Further, the control unit 36 may determine the operating speed of the gas turbine 12 at which the fuel is isolated. For example, if the exhaust temperature is relatively low during a specific shut-down operation, more inlet air flow and time may be used to achieve the desired purging volume. Accordingly, the control unit 36, upon determining the desired purging volume, may instruct the system 10 to isolate the fuel from the gas turbine 12 at a greater than nominal isolation speed. Alternatively, if the exhaust temperature is relatively high during a specific shut-down operation, less inlet air flow and time may be used to achieve the desired purging volume. In such a situation, the control unit 36 may instruct the system 10 to isolate the fuel at a lesser than nominal isolation speed. In this manner, the control unit 36 is able to account for various speeds of the gas turbine 12 during a shut-down operation to meet the desired purging volume of the purging operation.

Subsequently, at block 176, the control unit 36 may instruct the system to provide an additional purging flow to the gas turbine 12. For example, the control unit 36 may instruct the blower 162 to provide increased air flow to the inlet of the compressor section 20. Additionally or alternatively, the control unit 36 may instruct the water wash system 164 to begin a water wash operation, which, as described above in the discussion of FIG. 9, increases the purging flow when the water becomes water vapor in the gas turbine 12. Moreover, the control unit 36 may instruct the displacement gas supply 68 to provide additional purging flow by way of the diluents stored within the displacement gas supply 68. Each of the blower 162, the water wash system 164, and the displacement gas supply 68 may provide additional purging flow to the gas turbine either alone or in combination with each other. Collectively, the blower 162, the water wash system 164, and the displacement gas supply 68 may be defined as additional purging flow sources. The control unit 36 may instruct the additional purging flow sources to remain active until the determined purge flow credit is achieved.

Additionally, in some embodiments, the additional purging flow sources may remain active until the system 10 reaches the minimum purging flow rate. At such a time, the system 10 may activate the starting system to maintain the system 10 at or above the minimum purging flow rate. By maintaining the additional purging flow sources in an active state, an amount of time that the starting system is active is reduced. In this manner, less energy is expended to accomplish the purging process, and the purging process may be completed in a shorter amount of time.

After the desired purge flow credit is achieved, at block 178, the additional purging flow sources may be removed from the system 10. Additionally, at this point, any other purge flow increasing application applied to the system 10 may also be removed to enable the system 10 to rapidly shut-down. After shut-down of the system 10, the system 10 may be in a "purge complete" condition without any additional purging upon start-up.

It may be appreciated that the methods 80, 110, 150, and 170 may all be used alone or in various combinations with each other to achieve the desired purge value of the system 10 during shut-down of the system 10. It should be noted that the HRSG system may be utilized with either simple cycle or combined cycle systems. In addition, the system 10 may include exhaust treatment systems (e.g., selective catalytic reduction systems, duct burners, diverter dampers, etc.).

This written description uses examples to disclose the subject matter of the disclosure, including the best mode, and also to enable any person skilled in the art to practice the disclosed subject matter, including making and using any devices or systems and performing any incorporated methods. The patentable scope of the disclosed subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a controller of a gas turbine and heat recovery steam generator (HRSG) system, comprising:
a memory storing instructions to perform operations of the gas turbine and HRSG system; and
a processor configured to execute the instructions, wherein the instructions, when executed by the processor, cause the controller to:
control purging fluid flow from at least one purging fluid flow source to an inlet of a compressor section of a gas turbine of the gas turbine and HRSG system, an exhaust of the gas turbine, or a combustion section of the gas turbine during deceleration of the gas turbine;
receive a first input signal representative of a first temperature at the inlet of the compressor section of the gas turbine, a second input signal representative of a rotational speed of the gas turbine, and a third input signal representative of a purging fluid flow rate during deceleration of the gas turbine of the at least one purging fluid flow source;
calculate an exhaust flow rate of the gas turbine and HRSG system based on at least the first input signal, the second input signal, and the third input signal; and
control the gas turbine and HRSG system, during shut-down of the gas turbine and HRSG system, to isolate a fuel source from the gas turbine at a portion of normal operating speed of the gas turbine sufficient to achieve a predetermined purging volume during coast down of air flow through the gas turbine and HRSG system based on the exhaust flow rate.

2. The system of claim 1, wherein the instructions, when executed by the processor, cause the controller to receive a fourth input signal representative of a second temperature at an exhaust of the gas turbine or an exhaust stack of an HRSG of the gas turbine and HRSG system, and the exhaust flow rate is based at least in part on the fourth input signal in addition to the first input signal, the second input signal, and the third input signal.

3. The system of claim 1, wherein controlling the at least one purging fluid flow source to provide the purging fluid flow to the inlet of the gas turbine or to the exhaust of the gas turbine increases the exhaust flow rate of the gas turbine and HRSG system.

4. The system of claim 1, comprising:
a first temperature sensor that provides the first input signal;
a rotational speed sensor that provides the second input signal; and
a fluid flow sensor that provides the third input signal.

5. The system of claim 1, wherein the at least one purging fluid flow source comprises a blower, a water wash system, and a diluent source.

6. The system of claim 1, wherein the at least one purging fluid flow source comprises a diluent source configured to provide diluent flow to the combustion section of the gas turbine.

7. The system of claim 1, wherein the at least one purging fluid flow source comprises a water wash system, wherein the water wash system is configured to provide a water wash to the inlet of the compressor section of the gas turbine.

8. The system of claim 7, wherein the instructions, when executed by the processor, cause the controller to control the water wash system to cease providing the water wash to the inlet when the gas turbine reaches a minimum speed beyond which the water wash stops vaporizing.

9. The system of claim 1, wherein the at least one purging fluid flow source comprises a blower, wherein the blower is configured to provide additional purging fluid flow to the inlet of the compressor section of the gas turbine, to the exhaust of the gas turbine, or to an exhaust stack of an HRSG of the gas turbine and HRSG system.

10. The system of claim 1, wherein the instructions, when executed by the processor, cause the controller to control the gas turbine and HRSG system to isolate the fuel source from the gas turbine when the purging fluid flow is provided to the gas turbine, and the gas turbine reaches the portion of normal operating speed of the gas turbine sufficient to achieve the purging volume while the gas turbine operates at a speed greater than a minimum purge flow requirement of the gas turbine.

11. A method, comprising:
utilizing a controller to:
control at least one purging fluid flow source to provide a supplemental purging fluid flow to a gas turbine or a heat recovery steam generator (HRSG) of a gas turbine and HRSG system;
receive a first measurement of a first temperature of the gas turbine and HRSG system from a first sensor, wherein the first measurement of the first temperature comprises at least a temperature at an inlet of the gas turbine;
receive a second measurement of a rotational speed of the gas turbine from a second sensor;
receive a third measurement of a supplemental purging fluid flow rate of the supplemental purging fluid flow during deceleration of the gas turbine from a third sensor;
calculate an exhaust volume flow rate of the gas turbine and HRSG system based on at least the first temperature, the rotational speed of the gas turbine, and the purging fluid flow rate;
obtain a purging volume of the gas turbine and HRSG system that is based on at least a volume of an HRSG of the gas turbine and HRSG system; and
control the gas turbine and HRSG system, during shut-down of the gas turbine and HRSG system, to isolate a fuel source from the gas turbine at a portion of normal operating speed of the gas turbine sufficient to achieve the purging volume during coast down of air flow through the gas turbine and HRSG system based on the exhaust volume flow rate.

12. The method of claim 11, wherein the first sensor comprises a temperature sensor positioned at an inlet of a compressor section of the gas turbine, and the second sensor comprises a rotational speed sensor of the gas turbine.

13. The method of claim 11, comprising utilizing a controller to receive a fourth measurement of a second temperature of the gas turbine and HRSG system from a fourth sensor, wherein the fourth sensor comprises a temperature sensor positioned at an exhaust of the gas turbine or an exhaust stack of the HRSG, and calculating the exhaust volume flow rate of the gas turbine and HRSG system is based on at least the fourth parameter.

14. The method of claim 11, wherein the at least one purging fluid flow source comprises a blower, a water wash system, a diluent source, or any combination thereof.

15. The method of claim 11, wherein the at least one purging fluid flow source provides the supplemental purging fluid flow to an inlet of a compressor section of the gas turbine, to a combustion section of the gas turbine, to an exhaust of the gas turbine, to an exhaust stack of the HRSG, or any combination thereof.

16. A tangible, non-transitory, machine-readable-medium, comprising machine-readable instructions to:
control at least one purging fluid flow source to provide a supplemental purging fluid flow to a gas turbine of a power generation system;
receive a first measurement of a first temperature of the power generation system from a first sensor, wherein the first measurement of the first temperature comprises at least a temperature at an inlet of the gas turbine;
receive a second measurement of a rotational speed of the gas turbine from a second sensor;
receive a third measurement of a supplemental purging fluid flow rate of the supplemental purging fluid flow during deceleration of the gas turbine from a third sensor;
calculate an exhaust flow rate of the power generation system based on at least the first temperature, the rotational speed of the gas turbine, and the supplemental purging fluid flow rate; and
control the power generation system, during shut-down of the power generation system, to isolate a fuel source from the gas turbine at a portion of normal operating speed of the power generation system sufficient to achieve a purging volume during coast down of air flow through the power generation system based at least on the exhaust flow rate.

17. The machine-readable-medium of claim 16, wherein the at least one purging fluid flow source comprises a blower, a water wash system, a diluent source, or any combination thereof.

18. The machine-readable-medium of claim 16, wherein the purging volume is based on at least a volume of a defined portion of the power generation system that comprises a heat recovery steam generator.

19. The machine-readable-medium of claim 16, wherein the supplemental purging fluid flow is provided by the at least one purging fluid flow source to a compressor section of the gas turbine, to a combustion section of the gas turbine, to an exhaust of the gas turbine, to an exhaust stack of a heat recovery steam generator of the power generation system, or any combination thereof.

20. The machine-readable-medium of claim 16, wherein the purging volume is achieved while the power generation system remains at a speed greater than a minimum purging speed of the power generation system.

* * * * *